(12) United States Patent
Kim et al.

(10) Patent No.: US 11,698,683 B1
(45) Date of Patent: Jul. 11, 2023

(54) DISTRIBUTED INFLATABLE TOUCH SENSING

(71) Applicants: GM Global Technology Operations LLC, Detroit, MI (US); Regents of the University of Michigan, Ann Arbor, MI (US)

(72) Inventors: Wonhee Michael Kim, Royal Oak, MI (US); Paul W. Alexander, Ypsilanti, MI (US); Diann Brei, Milford, MI (US); Jonathan E. Luntz, Ann Arbor, MI (US); Koray Benli, Ann Arbor, MI (US); Laura Alejandra Giner Munoz, Ann Arbor, MI (US); James Menno Nykamp, Woodbridge, VA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/742,795

(22) Filed: May 12, 2022

(51) Int. Cl.
*G06F 3/01* (2006.01)
*G06F 3/041* (2006.01)

(52) U.S. Cl.
CPC ............ *G06F 3/016* (2013.01); *G06F 3/0414* (2013.01); *G06F 3/0416* (2013.01); *G06F 2203/04103* (2013.01)

(58) Field of Classification Search
None
See application file for complete search history.

(56) References Cited

U.S. PATENT DOCUMENTS

2018/0267640 A1* 9/2018 Virgili ..................... G06F 3/016
2021/0170951 A1 6/2021 Alexander et al.

* cited by examiner

*Primary Examiner* — Stephen T. Reed
(74) *Attorney, Agent, or Firm* — Vivacqua Crane, PLLC

(57) ABSTRACT

A distributed inflatable touch sensing system is provided. The distributed inflatable touch sensing system includes a sensing bladder array, the sensing bladder array having a plurality of bladders, passageways, and ports in fluid communication. The system further includes a pressure regulator in fluid communication with one of the plurality of ports for regulating a pressure in the sensing bladder array. The system further includes a plurality of sensors, each in fluid communication with one of the plurality of ports, for measuring the pressure in the sensing bladder array. The system further includes a processor in communication with the plurality of sensors. The processor is configured to determine which of the plurality of bladders has been depressed by a user.

20 Claims, 5 Drawing Sheets

US 11,698,683 B1

DISTRIBUTED INFLATABLE TOUCH SENSING

INTRODUCTION

The present disclosure relates to human-machine interfaces, and more particularly, to a distributed inflatable touch sensing system for reduced complexity of the sensing electronics, mutability of interface features when not in use, and ease of fabrication.

Human-machine interfaces (HMIs) allow users to interact with machines in order to control the operation of the machine. HMIs have been developed to allow users to interact with various machines, including, for example, computers, smartphones, vehicles, and industrial machines. Examples of HMIs may include touch screens, electrical switches and buttons, rotary knobs, capacitive sensors, keyboards, computer mice, and the like. HMIs are often sensitive to environmental conditions, such as dust, moisture, or electrical noise. Additionally, HMIs may take up a large amount of space in or on the machine which they control. For example, HMI systems like touch screens, buttons, and knobs may occupy a significant portion of the dashboard or center console of an automobile. Also, some types of HMIs, for example touch screens, may not provide tactile feedback to the user during use. While some types of HMIs, for example electrical switches and buttons, may provide the user with tactical feedback when interacting with them, the nature and strength of this feedback is determined by the mechanical design of the HMI and thus cannot be adjusted during use based on, for example, the context of the user interaction.

Thus, while current human-machine interfaces achieve their intended purpose, there is a need for a new and improved system and method for allowing a user to interact with a machine.

SUMMARY

According to several aspects, a distributed inflatable touch sensing system is provided. The distributed inflatable touch sensing system includes a sensing bladder array, the sensing bladder array having a first thermoplastic sheet having an interior surface and an exterior surface, the interior surface having a sealing portion and a plurality of non-sealing portions. The sensing bladder array further includes a second thermoplastic sheet having an interior surface and an exterior surface. The interior surface includes a sealing portion and a plurality of non-sealing portions. Moreover, the sealing portion of the interior surface of the first thermoplastic sheet is fixedly attached to the sealing portion of the interior surface of the second thermoplastic sheet. A first of the plurality of non-sealing portions of the interior surface of the first thermoplastic sheet and a first of the plurality of non-sealing portions of the interior surface of the second thermoplastic sheet form a plurality of bladders. A second of the plurality of non-sealing portions of the interior surface of the first thermoplastic sheet and a second of the plurality of non-sealing portions of the interior surface of the second thermoplastic sheet form a plurality of passageways, each of the plurality of passageways having a volume. The plurality of passageways are in fluid communication with the plurality of bladders. A third of the plurality of non-sealing portions of the interior surface of the first thermoplastic sheet and a third of the plurality of non-sealing portions of the interior surface of the second thermoplastic sheet form a plurality of ports. The plurality of ports are in fluid communication with the plurality of bladders. The distributed inflatable touch sensing system further includes a pressure regulator for regulating a pressure in the sensing bladder array. The pressure regulator is in fluid communication with at least one of the plurality of ports. The distributed inflatable touch sensing system further includes a plurality of sensors for measuring the pressure in the sensing bladder array, each of the plurality of sensors being in fluid communication with at least one of the plurality of ports. The distributed inflatable touch sensing system further includes a processor in communication with the plurality of sensors configured to receive a plurality of pressure measurements from the plurality of sensors. The processor is further configured to determine which of the plurality of bladders has been depressed by a user.

In an additional aspect of the present disclosure, the first thermoplastic sheet and the second thermoplastic sheet are made of a material selected from the group consisting of polyethylene, thermoplastic polyurethane, and polypropylene.

In another aspect of the present disclosure, the sealing portions of the interior surfaces of the first and second thermoplastic sheets are fixedly attached using a heat seal.

In another aspect of the present disclosure, the processor is programmed to receive a plurality of pressure measurements from each of the plurality of sensors over a fixed time period. The processor is further programmed to determine, for each of the plurality of sensors, a time at which a maximum pressure is measured by each of the plurality of sensors. The processor is also programmed to calculate, using a predetermined algorithm, which of the plurality of bladders has been depressed by the user. The predetermined algorithm is based at least in part on the time at which the maximum pressure is measured by each of the plurality of sensors.

In another aspect of the present disclosure, the predetermined algorithm further includes a calculation of a difference between the time at which the maximum pressure is measured by a first of the plurality of sensors and the time at which the maximum pressure is measured by a second of the plurality of sensors.

In another aspect of the present disclosure, the calculated difference between the time at which the maximum pressure is measured by the first of the plurality of sensors and the time at which the maximum pressure is measured by the second of the plurality of sensors is dependent, at least in part, on the volume of each of the plurality of passageways.

In another aspect of the present disclosure, the plurality of bladders and plurality of passageways are arranged to form a one-dimensional array and the plurality of sensors is three sensors.

In another aspect of the present disclosure, the predetermined algorithm further includes a calculation of an identifier value using the following formula:

$$x = \arctan\left(\frac{t_3 - t_2}{t_1 - t_2}\right)$$

x defines the identifier value, $t_1$ defines the time at which the maximum pressure is measured by the first of the plurality of sensors, $t_2$ defines the time at which the maximum pressure is measured by the second of the plurality of sensors, and $t_3$ defines the time at which the maximum pressure is measured by a third of the plurality of sensors.

In another aspect of the present disclosure, the predetermined algorithm further includes a comparison of the identifier value with a set of predetermined ranges corresponding to each of the plurality of bladders. The predetermined algorithm further includes a determination of which of the plurality of bladders has been depressed by the user. When the identifier value is within one of the sets of predetermined ranges corresponding to one of the plurality of bladders, that one of the plurality of bladders is determined to have been depressed by the user.

In another aspect of the present disclosure, at least one of the passageways contains a restriction. The restriction is at least one of a porous material, a bend, and a reduced cross-sectional area. The calculated difference is dependent, at least in part, on the restriction in the passageway.

According to several aspects, a method for manufacturing a distributed inflatable touch sensing bladder array is provided. The method includes cutting a mask into a shape defining a plurality of bladder portions, passageway portions, and port portions. The method further includes disposing a porous material on each of the plurality of passageway portions of the mask and attaching the mask having the porous material disposed thereon to an interior surface of a first thermoplastic sheet. The method further includes removing the plurality of passageway portions of the mask, so that the porous material remains between each of the plurality of bladder portions. The method further includes placing a second thermoplastic sheet on the first thermoplastic sheet. The portions of the interior surfaces of the first and second thermoplastic sheets which are in contact with the mask or the porous material are defined to be masked portions. The portions of the interior surfaces of the first and second thermoplastic sheets which are not in contact with the mask or the porous material are defined to be un-masked portions. The method further includes fusing the un-masked portions of the interior surface of the second thermoplastic sheet to the un-masked portions of the interior surface of the first thermoplastic sheet to form a heat-seal, thereby forming an air-tight volume between the masked portions of the interior surfaces of the first and second thermoplastic sheets.

In another aspect of the present disclosure, the cutting step further includes cutting a mask into a shape defining a plurality of bladder portions, passageway portions, and port portions. The plurality of bladder portions and the plurality of passageway portions are arranged in a one-dimensional array.

In another aspect of the present disclosure, the first thermoplastic sheet and the second thermoplastic sheet are selected from the group consisting of a first polyethylene sheet and a second polyethylene sheet, a first thermoplastic polyurethane sheet and a second thermoplastic polyurethane sheet, and a first polypropylene sheet and a second polypropylene sheet.

In another aspect of the present disclosure, the mask is made of glassine paper.

In another aspect of the present disclosure, the porous material is selected from the group consisting of a porous polyester thread, a porous nylon thread, and a porous cotton thread.

In another aspect of the present disclosure, the method further includes affixing a first textile layer to an exterior surface of the first thermoplastic sheet and affixing a second textile layer to an exterior surface of the second thermoplastic sheet.

According to several aspects, a distributed inflatable touch sensing system is provided. The distributed inflatable touch sensing system includes a sensing bladder array, the sensing bladder array having a first thermoplastic sheet having an interior surface and an exterior surface, the interior surface having a sealing portion and a plurality of non-sealing portions. The sensing bladder array further includes a second thermoplastic sheet having an interior surface and an exterior surface. The interior surface includes a sealing portion and a plurality of non-sealing portions, wherein the sealing portion of the interior surface of the first thermoplastic sheet is fixedly attached to the sealing portion of the interior surface of the second thermoplastic sheet. A first of the plurality of non-sealing portions of the interior surface of the first thermoplastic sheet and a first of the plurality of non-sealing portions of the interior surface of the second thermoplastic sheet form a plurality of bladders. A second of the plurality of non-sealing portions of the interior surface of the first thermoplastic sheet and a second of the plurality of non-sealing portions of the interior surface of the second thermoplastic sheet form a plurality of passageways, each of the plurality of passageways having a volume. The plurality of passageways are in fluid communication with the plurality of bladders. A third of the plurality of the non-sealing portions of the interior surface of the first thermoplastic sheet and a third of the plurality of non-sealing portions of the interior surface of the second thermoplastic sheet form a plurality of ports. The plurality of ports are in fluid communication with the plurality of bladders. The sensing bladder array further includes a porous material disposed in each of the plurality of passageways. The distributed inflatable touch sensing system further includes a pressure regulator for regulating a pressure in the sensing bladder array. The pressure regulator is in fluid communication with at least one of the plurality of ports. The distributed inflatable touch sensing system further includes a plurality of sensors for measuring the pressure in the sensing bladder array, each of the plurality of sensors being in fluid communication with at least one of the plurality of ports. The distributed inflatable touch sensing system further includes a processor in communication with the plurality of sensors configured to receive pressure measurements from the plurality of sensors. The processor is programmed to receive a plurality of pressure measurements from each of the plurality of sensors over a fixed time period and determine, for each of the plurality of sensors, a time at which a maximum pressure is measured by each of the plurality of sensors. The processor is further programmed to determine, based at least in part on the time at which the maximum pressure is measured by each of the plurality of sensors, which of the plurality of bladders has been depressed by a user.

In another aspect of the present disclosure, the plurality of bladders and the plurality of passageways are arranged in a one-dimensional array, and the plurality of sensors is three sensors.

In another aspect of the present disclosure, the plurality of bladders and the plurality of passageways are further arranged in a circular pattern.

In another aspect of the present disclosure, the plurality of bladders and the plurality of passageways are arranged in a two-dimensional array, and the plurality of sensors is four sensors.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
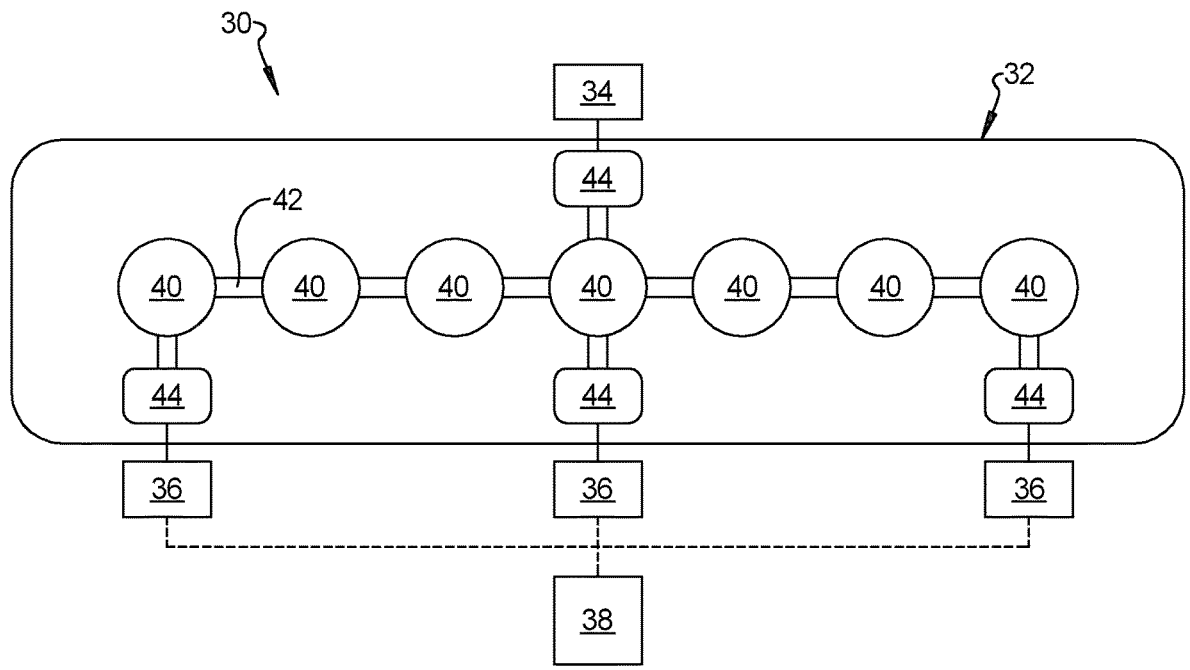
FIG. 1 is a system diagram of a distributed inflatable touch sensing system according to an exemplary embodiment.

Referring to FIG. 1, a distributed inflatable touch sensing system 30 is shown. The system 30 includes a sensing bladder array 32, a pressure regulator 34, a plurality of sensors 36, and a processor 38. The sensing bladder array 32 includes a plurality of bladders 40, a plurality of passageways 42, and a plurality of ports 44. The plurality of bladders 40 are in fluid communication with the each of the plurality of passageways 42. The bladders 40 provide an interface whereby a user can interact with the distributed inflatable touch sensing system 30. The system 30 is configured to determine which of the plurality of bladders 40 is being interacted with by the user. Each of the plurality of ports 44 which are formed in the sensing bladder array 32 provide fluid communication with the pressure regulator 34 and each of the plurality of sensors 36.

The pressure regulator 34 is in fluid communication with one of the ports 44 of the sensing bladder array 32. The pressure regulator 34 allows the sensing bladder array 32 to be pressurized with a fluid to a predetermined pressure. For example, the fluid may be air, and the predetermined pressure may be 3 pounds per square inch (PSI). By regulating the pressure in the sensing bladder array 32 using the pressure regulator 34, the stiffness of the bladders 40 can be controlled, thus providing adjustable tactile feedback to the user when interacting with the bladders 40. The pressure regulator 34 may also be used to release the pressure from the sensing bladder array 32, allowing the bladders 40 and passageways 42 to be deflated when the distributed inflatable touch sensing system 30 is not in use.

The plurality of sensors 36 are each in fluid communication with one of the plurality of ports 44 of the sensing bladder array 32. The plurality of sensors 36 are pressure measuring sensors configured to measure the pressure in the sensing bladder array 32.

The processor 38 is in communication with the plurality of sensors 36. The processor 38 is programmed to receive a plurality of pressure measurements from the plurality of sensors 36 and to determine which of the plurality of bladders 40 has been interacted with or depressed by a user. The processor 38 may be configured to transmit information about which bladder 40 has been depressed. The processor 38 may also be configured to activate or otherwise influence the operation of another system, for example a heating, ventilation, and air conditioning (HVAC) system in a vehicle (not shown), based on the determination of which bladder 40 has been depressed by a user.

Figure 2:
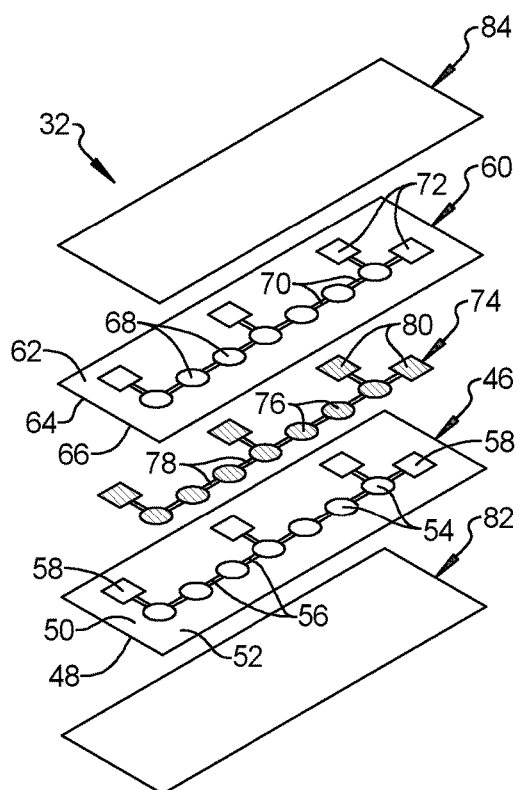
FIG. 2 is an exploded view of a sensing bladder array according to an exemplary embodiment.

Referring to FIG. 2 an exploded view of the sensing bladder array 32 is illustrated, in accordance with an exemplary embodiment. Array 32 is formed of two thermoplastic sheets 46 and 60. The first thermoplastic sheet 46 has an exterior surface 48 and an interior surface 50. The interior surface 50 includes a sealing portion 52 and a plurality of non-sealing portions 54, 56, and 58. The first of the plurality of non-sealing portions 54 defines one half of the plurality of bladders 40. The second of the plurality of non-sealing portions 56 defines one half of the plurality of passageways 42. The third of the plurality of non-sealing portions 58 defines one half of the plurality of ports 44.

The second thermoplastic sheet 60 has an exterior surface 62 and an interior surface 64. The interior surface 64 includes a sealing portion 66 and a plurality of non-sealing portions 68, 70, and 72. The first of the plurality of non-sealing portions 68 defines one half of the plurality of bladders 40. The second of the plurality of non-sealing portions 70 defines one half of the plurality of passageways 42. The third of the plurality of non-sealing portions 72 defines one half of the plurality of ports 44. The plurality of non-sealing portions 54, 56, and 58 on the interior surface 50 of the first thermoplastic sheet 46 align with the corresponding of the plurality of non-sealing portions 68, 70, and 72 on the interior surface 64 of the second thermoplastic sheet 60 when the first thermoplastic sheet 46 is stacked on the second thermoplastic sheet 60.

A mask 74 is disposed between the first thermoplastic sheet 46 and the second thermoplastic sheet 60. The mask 74 may be made of glassine paper, white paper, or another thin, non-melting material. The mask 74 may also be soluble to allow the mask to be dissolved and removed from the sensing bladder array 32. The mask 74 includes a plurality of bladder portions 76, passageway portions 78, and port portions 80. The plurality of bladder portions 76 of the mask 74 align with the corresponding non-sealing portions 54 on the first thermoplastic sheet 46 and the corresponding non-sealing portions 68 on the second thermoplastic sheet 60. The plurality of passageway portions 78 of the mask 74 align with the corresponding non-sealing portions 56 on the first thermoplastic sheet 46 and the corresponding non-sealing portions 70 on the second thermoplastic sheet 60. The plurality of port portions 80 of the mask 74 align with the corresponding non-sealing portions 58 on the first thermoplastic sheet 46 and the corresponding non-sealing portions 72 on the second thermoplastic sheet 60. Thus, the mask 74 prevents the first thermoplastic sheet 46 from contacting the second thermoplastic sheet 60 at the non-sealing portions 54, 56, 58, 68, 70, and 72.

The sensing bladder array 32 may also include a first textile layer 82 affixed to the exterior surface 48 of the first thermoplastic sheet 46 and a second textile layer 84 affixed to the exterior surface 62 of the second thermoplastic sheet 60. The first and second textile layers 82 and 84 are decorative layers which may enhance the aesthetics of the sensing bladder array 32.

Figure 3:
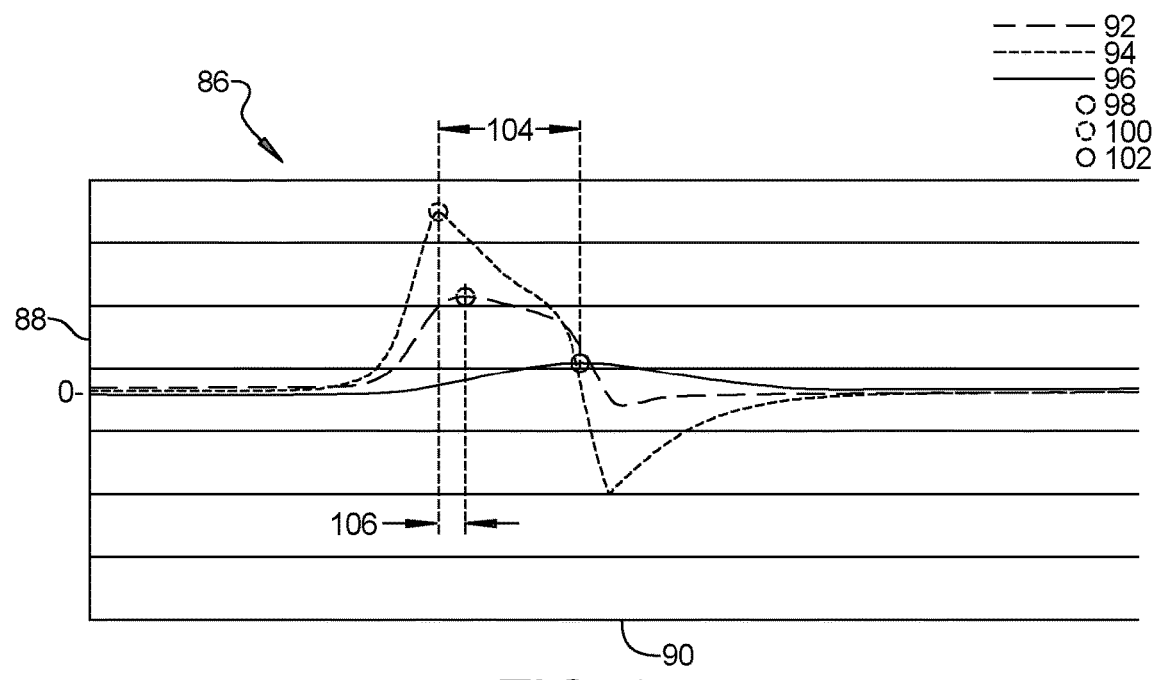
FIG. 3 is a graph of pressure measurement over time after a bladder is depressed, according to an exemplary embodiment.

Referring to FIG. 3, a graph 86 of a plurality of pressure measurements is provided. The processor 38 is programmed to receive the plurality of pressure measurements from the plurality of sensors 36. The vertical axis 88 of the graph 86 corresponds to a relative pressure measurement received by the processor 38. The horizontal axis 90 of the graph 86 corresponds to a fixed time period over which pressure measurements are received by the processor 38.

A first trace 92 shows the relative pressure over the fixed time period for a first of the plurality of pressure sensors 36. A second trace 94 shows the relative pressure over the fixed time period for a second of the plurality of pressure sensors 36. A third trace 96 shows the relative pressure over the fixed time period for a third of the plurality of pressure sensors 36.

The processor 38 is programmed to determine the time corresponding to the maximum relative pressure value of each of the traces 92, 94, and 96. The maximum relative pressure value for the trace 92 is referenced by reference numeral 98. The maximum relative pressure value for the trace 94 is referenced by reference numeral 100. The maximum relative pressure value for the trace 96 is referenced by reference numeral 102.

In addition to determining the time at which maximum relative pressure value occurs, the magnitude of the maximum relative pressure value may also be used to provide magnitude sensing capability. To provide magnitude sensing capability, the processor 38 may be programmed to compare the maximum relative pressure values 98, 100, and 102 with predetermined thresholds in order to determine a relative force with which the bladder 40 was depressed by the user.

After the maximum relative pressure values 98, 100, and 102 and the times at which they occur have been determined, the processor 38 is further programmed to calculate two time differences 104 and 106. A first time difference 104 is the difference between the time at which the maximum relative pressure value 102 is measured by the third of the plurality of pressure sensors 36 and the time at which the maximum relative pressure value 100 is measured by the second of the plurality of pressure sensors 36. A second time difference 106 is the difference between the time at which the maximum relative pressure value 98 is measured by the first of the plurality of pressure sensors 36 and the time at which the maximum relative pressure value 100 is measured by the second of the plurality of pressure sensors 36.

Figure 4:
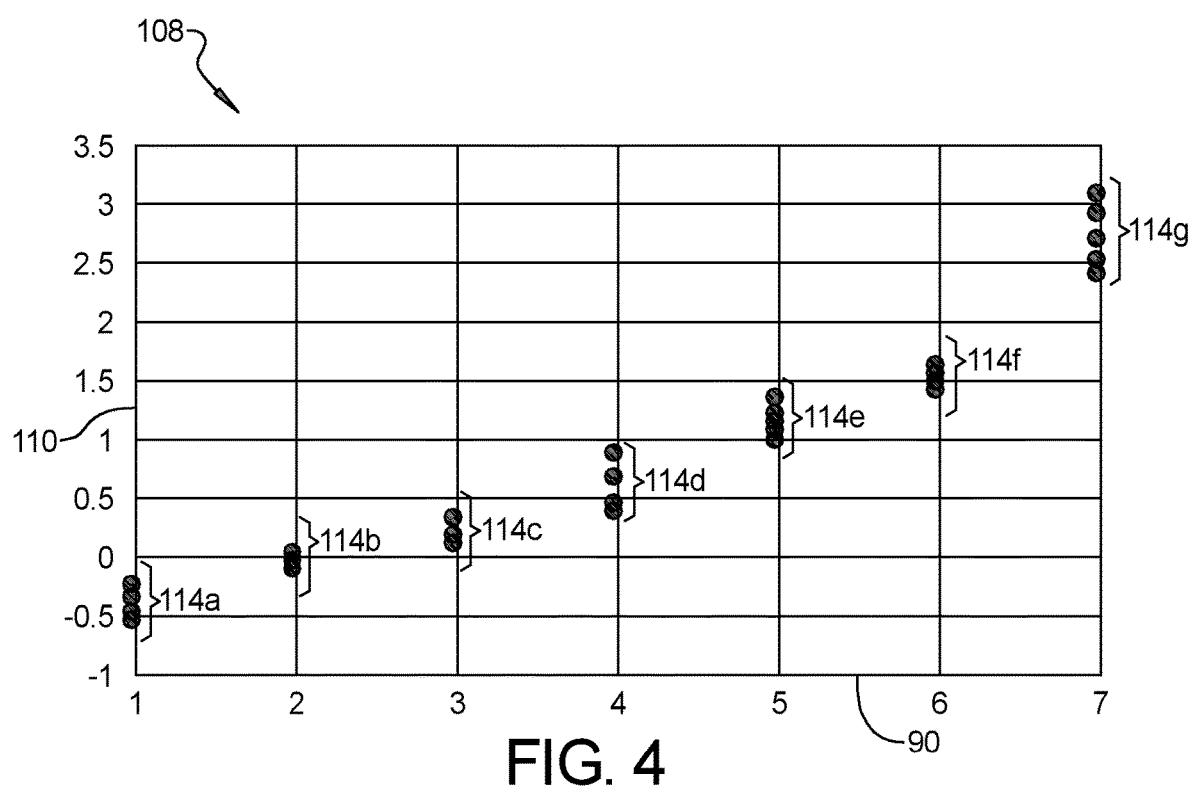
FIG. 4 is a graph of predetermined ranges of identifier values for a given bladder to be used to determine which bladder has been depressed according to an exemplary embodiment.

Referring to FIG. 4, a graph 108 of identifier values that are used to determine which bladder has been depressed by a user is shown. The processor 38 is further programmed to utilize a mathematical formula to calculate an identifier value and compare the identifier value with a set of pre-determined ranges 114 in order to determine which of the plurality of bladders 40 has been depressed by a user. The vertical axis 110 of the graph 108 corresponds to a calculated identifier value, and the horizontal axis 112 corresponds to the plurality of bladders 40, for example, seven bladders. The present disclosure contemplates multiple mathematical formulae which may be used to calculate an identifier value. Examples of mathematical formulae which may be used include:

$$\frac{t_3 - t_2}{t_1 - t_2}, \frac{\exp(t_3 - t_2)}{\exp(t_1 - t_2)}, \arctan\left(\frac{t_3 - t_2}{t_1 - t_2}\right), \frac{t_3 - t_2 + Y}{t_1 - t_2 + Y}$$

where $t_3-t_2$ is the first time difference 104, $t-t_2$ is the second time difference 106, and Y is an offset value, for example Y=0.5. The present disclosure contemplates that the identifier values may be calculated using other mathematical formulae.

For example, graph 108 was generated using multiple trials including multiple depressions of each of the seven bladders 40. The mathematical formula $$\arctan\left(\frac{t_3 - t_2}{t_1 - t_2}\right)$$

was used to calculate the identifier values shown in graph 108.

To determine which of the plurality of bladders 40 has been depressed by a user, the calculated identifier value is compared to a set of pre-determined ranges 114 corresponding to each of the plurality of bladders 40. If the identifier value is within the pre-determined range 114 corresponding to one of the plurality of bladders 40, that one of the plurality of bladders 40 is determined to have been depressed by the user.

FIGS. 5a, 5c, 5d, and 5e depict one-dimensional sensing bladder arrays 116, 118, 120 and 122. One-dimensional means that the bladders 40 are fluidly connected in a linear manner via passageways 42. Thus, each bladder 40 is connected in series to the next bladder 40 via one of the plurality of passageways 42, with the final bladder 124 not being connected to the first bladder 126. One-dimensional sensing bladder arrays 116, 118, 120 and 122 require at least three sensors 36 in order to determine which bladder 40 has been depressed by a user.

Figure 5A:
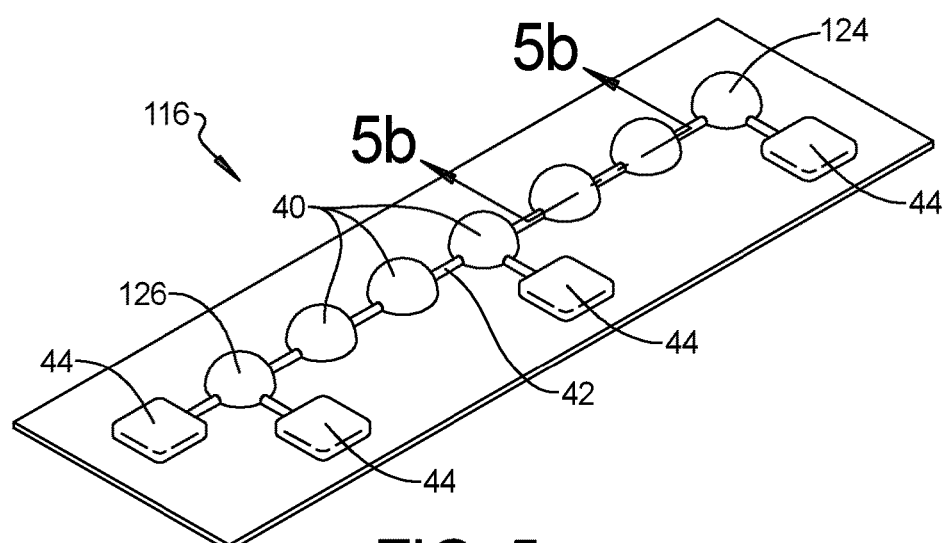
FIG. 5a is a perspective view of a one-dimensional sensing bladder array configured to be used with three sensors, according to an exemplary embodiment.

Referring to FIG. 5a, an example of a one-dimensional sensing bladder array 116 is shown. The one-dimensional sensing bladder array 116 shown in FIG. 5a includes seven bladders 40, four ports 44, and a plurality of passageways 42 providing fluid communication between the bladders 40 and the ports 44. The one-dimensional sensing bladder array 116 is configured to be connected to three sensors 36 and one pressure regulator 34 via four ports 44.

Figure 5B:
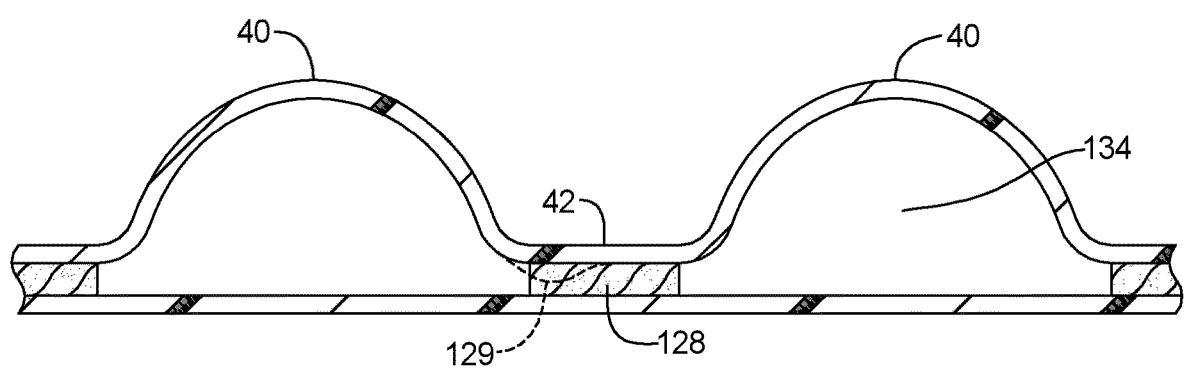
FIG. 5b is a cross-sectional view of a portion of a sensing bladder array with a passageway containing a restriction in the form of a porous material and a passageway with a reduced cross-sectional area, according to an exemplary embodiment.

Referring to FIG. 5b, a cross-sectional view of two bladders 40 and a passageway 42 of the exemplary one-dimensional sensing bladder array 116 is shown. A restriction has been placed within the passageway 42. The restriction may include a porous material 128, including for example a polyester thread, nylon thread, cotton thread, or a porous foam material. The inclusion of a porous material 128 in the passageway 42 reduces the volume of the passageway 42. A restriction within the passageway 42 may also include a reduced cross-sectional area of the passageway 42, as indicated by reference numeral 129. Properties of the porous material 128 such as the diameter and fiber properties may be chosen to influence the airflow in the passageways 42. Properties of the cross-sectional area reduction 129 in the passageway 42 may also be chosen to influence airflow in the passageways 42. Restrictions 128 and 129 in the passageways 42 may influence the calculated time differences 104 and 106 as discussed in reference to FIG. 3 and the accuracy and precision of the distributed inflatable touch sensing system 30.

Figure 5C:
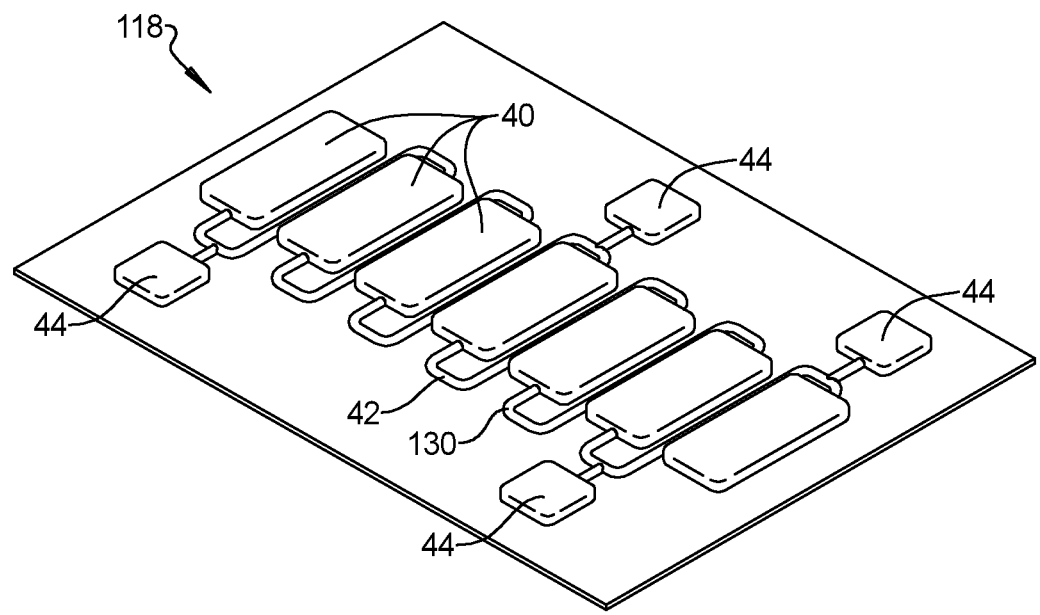
FIG. 5c is a perspective view of a one-dimensional sensing bladder array configured to be used with three sensors, with the passageways containing restrictions in the form of bends in the passageways, according to an exemplary embodiment.

Referring to FIG. 5c, a second example of a one-dimensional sensing bladder array 118 is shown. The one-dimensional sensing bladder array 118 includes seven bladders 40, four ports 44, and a plurality of passageways 42. The one-dimensional sensing bladder array 118 is configured to be connected to three sensors 36 and one pressure regulator 34, each of the three sensors 36 is connected to one of the four ports 44 and the pressure regulator 34 is connected to the fourth of the four ports 44. The passageways 42 include a plurality of bends 130. The bends 130 act as restrictions to airflow, thus influencing the calculated time differences 104 and 106 as discussed in reference to FIG. 3 and the accuracy and precision of the distributed inflatable touch sensing system 30. The second example of the one-dimensional sensing bladder array 118 illustrates that the passageways 42 may be routed along any desired path, creating bends 130 which may influence airflow.

Figure 5D:
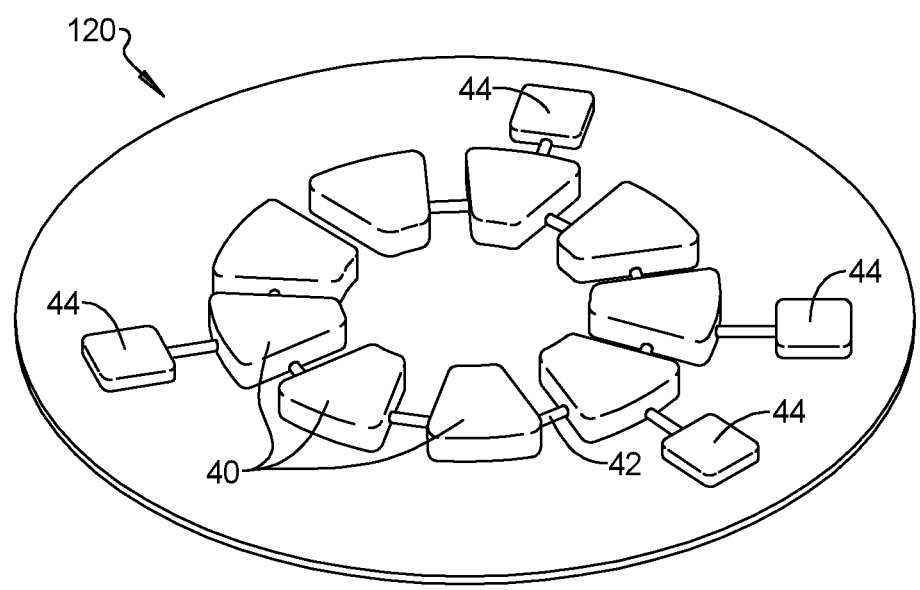
FIG. 5d is a perspective view of a one-dimensional sensing bladder array configured to be used with three sensors, with the bladders and passageways arranged in a circular arrangement, according to an exemplary embodiment.

Referring to FIG. 5d, a third example of a one-dimensional sensing bladder array 120 is shown. The one-dimensional sensing bladder array 120 includes nine bladders 40, four ports 44, and a plurality of passageways 42. The one-dimensional sensing bladder array 120 is configured to be connected to three sensors 36 and one pressure regulator 34. Each of the three sensors 36 is connected to one of the four ports 44 and the pressure regulator 34 is connected to a fourth of the four ports 44. The bladders 40 are arranged in a circular pattern, such that the one-dimensional sensing bladder array 120 may be used to emulate a rotary knob.

Figure 5E:
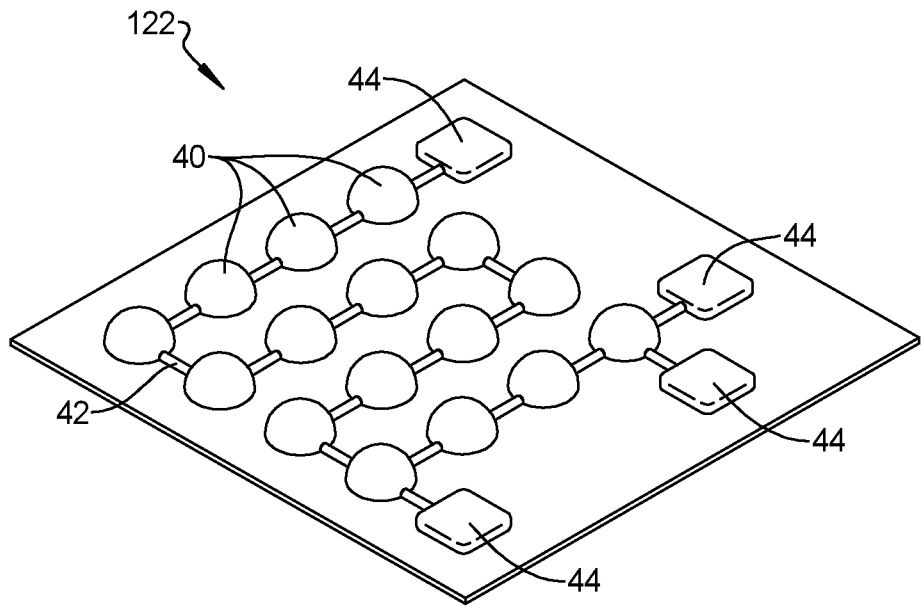
FIG. 5e is a perspective view of a one-dimensional sensing bladder array configured to be used with three sensors, with the bladders and passageways arranged in a pseudo two-dimensional grid arrangement, according to an exemplary embodiment.

Referring to FIG. 5e, a fourth example of a one-dimensional sensing bladder array 122 is shown. The one-dimensional sensing bladder array 122 includes sixteen bladders 40, four ports 44, and a plurality of passageways 42. The one-dimensional sensing bladder array 122 is configured to be connected to three sensors 36 and one pressure regulator 34. Each of the three sensors 36 is connected to one of the four ports 44 and the pressure regulator 34 is connected to the fourth of the four ports 44. The bladders 40 are arranged such that they appear to form a two-dimensional grid. However, the bladders 40 are connected via passageways 42 to form a one-dimensional array as discussed above.

Figure 5F:
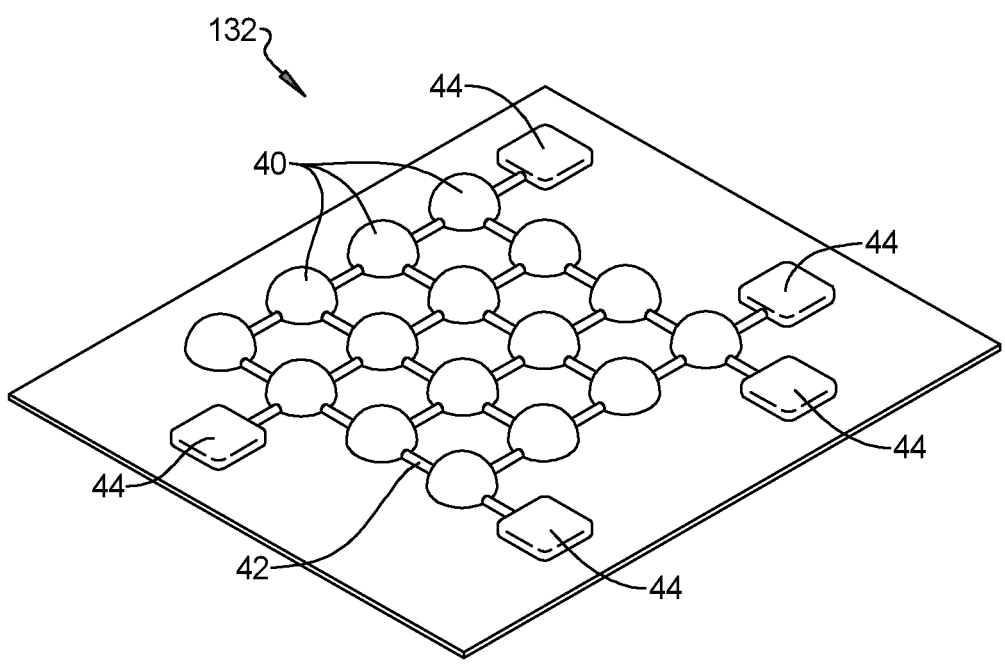
FIG. 5f is a perspective view of a two-dimensional sensing bladder array configured to be used with four sensors, with the bladders and passageways arranged in a two-dimensional grid arrangement, according to an exemplary embodiment.

Referring to FIG. 5f, a two-dimensional sensing bladder array 132 is illustrated. Two-dimensional means that the bladders 40 are fluidly connected in a two-dimensional grid via passageways 42. Thus, each bladder 40 is connected to each of the neighboring bladders 40 via passageways 42. The two-dimensional sensing bladder array 132 requires at least four sensors 36 in order to determine which bladder 40 has been depressed by a user.

The two-dimensional sensing bladder array 132 includes sixteen bladders 40, five ports 44, and a plurality of passageways 42. The two-dimensional sensing bladder array 132 is configured to be connected to four sensors 36 and one pressure regulator 34. Each of the four sensors 36 is connected to one of the five ports 44 and the pressure regulator 34 is connected to the fifth of the five ports. The sixteen bladders 40 are arranged to form a two-dimensional grid, and the bladders 40 are connected via passageways 42 to form a two-dimensional array as defined above.

In another aspect of the present disclosure, a method for manufacturing the sensing bladder array 32 for the distributed inflatable touch sensing system 30 is provided. In reference to FIG. 2 and to FIG. 5b, the method includes cutting the mask 74 into a shape defining a plurality of bladder portions 76, passageway portions 78, and port portions 80.

The method further includes disposing the porous material 128 on each of the plurality of passageway portions 78 of the mask 74 and attaching the mask 74 having the porous material 128 disposed thereon to the interior surface 50 of the first thermoplastic sheet 46. The step of disposing the porous material 128 allows for the creation of very narrow passageways or the inclusion of a restriction in the passageways by utilizing the porous material 128 as part of the mask 74. The step of disposing the porous material 128 may be omitted if narrow or restricted passageways are not desired.

The method further includes removing the plurality of passageway portions 78 of the mask 74, so that the porous material 128 remains between each of the plurality of bladder portions 76. Alternatively, the plurality of passageway portions 78 of the mask 74 may be left in place if the step of disposing the porous material 128 was omitted.

The method further includes placing the second thermoplastic sheet 60 on the first thermoplastic sheet 46. The portions of the interior surfaces 50 and 64 of the first and second thermoplastic sheets 46 and 60 which are in contact with the mask 74 or the porous material 128 are defined to be masked portions. The portions of the interior surfaces 50 and 64 of the first and second thermoplastic sheets 46 and 60 which are not in contact with the mask 74 or the porous material 128 are defined to be un-masked portions.

The method further includes fusing the un-masked portions of the interior surface of the first thermoplastic sheet 46 to the un-masked portions of the interior surface of the second thermoplastic sheet 60 to form a heat-seal. The heat seal is formed through the application of heat and pressure on the first and second thermoplastic sheets 46, 60, which fuses the un-masked portions of the sheets 46, 60. An air-tight volume 134 defining the bladders 40, the passageways 42, and the ports 44 is formed by the heat-sealing process.

The mask 74 may be made of glassine paper or a soluble paper sheet, so that the mask 74 may be washed away after heat-sealing. The porous material 128 may be removed after heat-sealing, leaving small passageways 42, or left in the sensing bladder array 32 to provide a restriction as discussed above in reference to FIG. 5b.

In another exemplary embodiment, the sensing bladder array 32 may be manufactured using a three-dimensional (3D) printer, a plastic molding or laser welding process, or a chemical adhesion process.

The distributed inflatable touch sensing system 30 of the present disclosure offers several advantages. For example, the system 30 has a thin profile, minimal electrical wiring, and is resistant to electrical noise. Additionally, the electrical components like the sensors and processor may be located separately from the sensing bladder array. Due to the flexibility of the materials and the lack of electronics located in the sensing bladder array 32, the sensing bladder array 32 can be deployed on complex surfaces or on the surface of an inflatable device. Moreover, regulating the pressure in the sensing bladder array 32 allows the sensing bladder array to be deflated when not in use. Advantageously, by stacking multiple sensing bladder arrays 32, multiple arrangements of bladders 40 and thus multiple interfaces may be presented to the user by selectively inflating or deflating particular of the stacked sensing bladder arrays 32. The method for manufacturing the sensing bladder array 32 of the present disclosure offers multiple advantages as well. The method may be performed quickly and at a low cost, even with complex mask 74 shapes. Additionally, the mask 74 shape may easily be changed without changing the method steps and with minimal cost and time penalty. The method of the present disclosure produces a thin, flat, flexible, and easy to clean sensing bladder array 32.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A distributed inflatable touch sensing system comprising:
   a sensing bladder array, comprising:
      a plurality of bladders;
      a plurality of ports;
      a plurality of passageways in fluid communication with the plurality of bladders and the plurality of ports, each of the plurality of passageways having a volume;
      a first thermoplastic sheet having an interior surface and an exterior surface, the interior surface having a sealing portion and a plurality of non-sealing portions;
      a second thermoplastic sheet having an interior surface and an exterior surface, the interior surface having a sealing portion and a plurality of non-sealing portions, wherein the sealing portion of the interior surface of the first thermoplastic sheet is fixedly attached to the sealing portion of the interior surface of the second thermoplastic sheet, wherein a first of the plurality of non-sealing portions of the interior surface of the first thermoplastic sheet and a first of the plurality of non-sealing portions of the interior surface of the second thermoplastic sheet form the plurality of bladders, and a second of the plurality of non-sealing portions of the interior surface of the first thermoplastic sheet and a second of the plurality of non-sealing portions of the interior surface of the second thermoplastic sheet form the plurality of passageways, and wherein the plurality of passageways are in fluid communication with the plurality of bladders;
   a pressure regulator for regulating a pressure in the sensing bladder array, wherein the pressure regulator is in fluid communication with at least one of the plurality of ports;
   a plurality of sensors for measuring the pressure in the sensing bladder array, wherein each of the plurality of sensors is in fluid communication with at least one of the plurality of ports; and
   a processor in communication with the plurality of sensors configured to receive a plurality of pressure measurements from the plurality of sensors, and to determine which of the plurality of bladders has been depressed by a user.

2. The sensing bladder array of claim 1, wherein
   a third of the plurality of the non-sealing portions of the interior surface of the first thermoplastic sheet and a third of the plurality of non-sealing portions of the interior surface of the second thermoplastic sheet form the plurality of ports, wherein the plurality of ports are in fluid communication with the plurality of bladders, and
   wherein the first thermoplastic sheet and the second thermoplastic sheet are made of a material selected from the group consisting of polyethylene, thermoplastic polyurethane, and polypropylene.

3. The distributed inflatable touch sensing system of claim 2, wherein the sealing portions of the interior surfaces of the first and second thermoplastic sheets are fixedly attached using a heat seal.

4. The distributed inflatable touch sensing system of claim 1, wherein the processor is programmed to receive a plurality of pressure measurements from each of the plurality of sensors over a fixed time period, determine, for each of the plurality of sensors, a time at which a maximum pressure is measured by each of the plurality of sensors, and determine which of the plurality of bladders has been depressed by the user based at least in part on the time at which the maximum pressure is measured by each of the plurality of sensors.

5. The distributed inflatable touch sensing system of claim 4, wherein to determine which of the plurality of bladders has been depressed by the user, the processor is further programmed to: calculate a difference between the time at which the maximum pressure is measured by a first of the plurality of sensors and the time at which the maximum pressure is measured by a second of the plurality of sensors.

6. The distributed inflatable touch sensing system of claim 5, wherein the calculated difference between the time at which the maximum pressure is measured by the first of the plurality of sensors and the time at which the maximum pressure is measured by the second of the plurality of sensors is dependent, at least in part, on the volume of each of the plurality of passageways.

7. The distributed inflatable touch sensing system of claim 6, wherein the plurality of bladders and plurality of passageways are arranged to form a one-dimensional array, and wherein the plurality of sensors is three sensors.

8. The distributed inflatable touch sensing system of claim 7, wherein to determine which of the plurality of bladders has been depressed by the user, the processor is further programmed to: calculate an identifier value using the following formula:

$$x = \arctan\left(\frac{t_3 - t_2}{t_1 - t_2}\right)$$

wherein x defines the identifier value, $t_1$ defines the time at which the maximum pressure is measured by the first of the plurality of sensors, $t_2$ defines the time at which the maximum pressure is measured by the second of the plurality of sensors, and $t_3$ defines the time at which the maximum pressure is measured by a third of the plurality of sensors.

9. The distributed inflatable touch sensing system of claim 8, wherein to determine which of the plurality of bladders has been depressed by the user, the processor is further programmed to: compare the identifier value with a plurality of sets of predetermined ranges corresponding to each of the plurality of bladders, and determine which of the plurality of bladders has been depressed by the user when the identifier value is within one of the sets of predetermined ranges corresponding to one of the plurality of bladders.

10. The distributed inflatable touch sensing system of claim 5, wherein at least one of the passageways contains a restriction, the restriction is defined by at least one of a porous material, a bend, and a reduced cross-sectional area, wherein the calculated difference is dependent, at least in part, on the restriction in at least one of the passageways.

11. A method for manufacturing a distributed inflatable touch sensing bladder array, the method comprising:

cutting a mask into a shape defining a plurality of bladder portions, passageway portions, and port portions;

disposing a porous material on each of the plurality of passageway portions of the mask;

attaching the mask having the porous material disposed thereon to an interior surface of a first thermoplastic sheet;

removing the plurality of passageway portions of the mask, wherein the porous material remains between each of the plurality of bladder portions;

placing a second thermoplastic sheet on the first thermoplastic sheet, wherein the portions of the interior surfaces of the first and second thermoplastic sheets which are in contact with the mask or the porous material define masked portions, and the portions of the interior surfaces of the first and second thermoplastic sheets which are not in contact with the mask or the porous material define un-masked portions; and fusing the un-masked portions of the interior surface of the second thermoplastic sheet to the un-masked portions of the interior surface of the first thermoplastic sheet to form a heat-seal, thereby forming an air-tight volume between the masked portions of the interior surfaces of the first and second thermoplastic sheets.

12. The method for manufacturing a distributed inflatable touch sensing bladder array of claim 11, wherein cutting a mask further comprises cutting a mask into a shape defining a plurality of bladder portions, passageway portions, and port portions, wherein the plurality of bladder portions and the plurality of passageway portions are arranged in a one-dimensional array.

13. The method for manufacturing a distributed inflatable touch sensing bladder array of claim 11, wherein the first thermoplastic sheet and the second thermoplastic sheet are selected from the group consisting of a first polyethylene sheet and a second polyethylene sheet, a first thermoplastic polyurethane sheet and a second thermoplastic polyurethane sheet, and a first polypropylene sheet and a second polypropylene sheet.

14. The method for manufacturing a distributed inflatable touch sensing bladder array of claim 11, wherein the mask is made of glassine paper.

15. The method for manufacturing a distributed inflatable touch sensing bladder array of claim 11, wherein the porous material is selected from the group consisting of a porous polyester thread, a porous nylon thread, and a porous cotton thread.

16. The method for manufacturing a distributed inflatable touch sensing bladder array of claim 11, the method further comprising:

affixing a first textile layer to an exterior surface of the first thermoplastic sheet; and affixing a second textile layer to an exterior surface of the second thermoplastic sheet.

17. A distributed inflatable touch sensing system comprising:

a sensing bladder array, including:

a first thermoplastic sheet having an interior surface and an exterior surface, the interior surface having a sealing portion and a plurality of non-sealing portions;

a second thermoplastic sheet having an interior surface and an exterior surface, the interior surface having a sealing portion and a plurality of non-sealing portions, wherein the sealing portion of the interior surface of the first thermoplastic sheet is fixedly attached to the sealing portion of the interior surface of the second thermoplastic sheet, and a first of the plurality of non-sealing portions of the interior surface of the first thermoplastic sheet and a first of the plurality of non-sealing portions of the interior surface of the second thermoplastic sheet form a plurality of bladders, and a second of the plurality of non-sealing portions of the interior surface of the first thermoplastic sheet and a second of the plurality of non-sealing portions of the interior surface of the second thermoplastic sheet form a plurality of passageways, wherein the plurality of passageways are in fluid communication with the plurality of bladders, each of the plurality of passageways having a volume, and a third of the plurality of the non-sealing portions of the interior surface of the first thermoplastic sheet and a third of the plurality of non-sealing portions of the interior surface of the second thermoplastic sheet form a plurality of ports, wherein the plurality of ports are in fluid communication with the plurality of bladders; and a porous material disposed in each of the plurality of passageways;

a pressure regulator for regulating a pressure in the sensing bladder array, wherein the pressure regulator is in fluid communication with at least one of the plurality of ports;

a plurality of sensors for measuring the pressure in the sensing bladder array, wherein each of the plurality of sensors is in fluid communication with at least one of the plurality of ports; and a processor in communication with the plurality of sensors configured to receive pressure measurements from the plurality of sensors, wherein the processor is programmed to receive a plurality of pressure measurements from each of the plurality of sensors over a fixed time period, determine, for each of the plurality of sensors, a time at which a maximum pressure is measured by each of the plurality of sensors, and determine, based at least in part on the time at which the maximum pressure is measured by each of the plurality of sensors, which of the plurality of bladders has been depressed by a user.

18. The distributed inflatable touch sensing system of claim 17, wherein the plurality of bladders and the plurality of passageways are arranged in a one-dimensional array, and the plurality of sensors is three sensors.

19. The distributed inflatable touch sensing system of claim 18, wherein the plurality of bladders and the plurality of passageways are further arranged in a circular pattern.

20. The distributed inflatable touch sensing system of claim 17, wherein the plurality of bladders and the plurality of passageways are arranged in a two-dimensional array, and the plurality of sensors is four sensors.

* * * * *